United States Patent [19]
Laskowski

[11] Patent Number: 6,000,202
[45] Date of Patent: Dec. 14, 1999

[54] APPARATUS FOR SUPPORTING A CUTTING BLADE ON A MOWER

[75] Inventor: Jeffrey J. Laskowski, Lizton, Ind.

[73] Assignee: Lastec, Inc., Lizton, Ind.

[21] Appl. No.: 08/899,528

[22] Filed: Jul. 24, 1997

[51] Int. Cl.⁶ .................................................. A01D 34/66
[52] U.S. Cl. ........................ 56/14.9; 56/15.8; 56/320.1; 56/DIG. 3; 56/DIG. 10; 56/DIG. 14; 56/DIG. 22
[58] Field of Search ..................... 56/15.1, 14.9, 56/15.6, 15.7, 15.8, 15.9, 17.2, 13.5, 6, 320.1, 208, 228, DIG. 3, DIG. 10, DIG. 14, DIG. 22

[56] References Cited

U.S. PATENT DOCUMENTS

| | | | |
|---|---|---|---|
| 4,930,298 | 6/1990 | Zenner | 56/17.4 |
| 5,249,411 | 10/1993 | Hake | 56/13.5 X |
| 5,355,664 | 10/1994 | Zenner | 56/DIG. 3 X |
| 5,771,669 | 6/1998 | Langworthy et al. | 56/15.8 X |

*Primary Examiner*—Terry Lee Melius
*Attorney, Agent, or Firm*—Woodard, Emhardt, Naughton, Moriarty & McNett

[57] ABSTRACT

A mowing apparatus with multiple articulating cutting decks includes a support for the cutting blades which is pivotally attached at one end to the mower and is carried by a rocker arm at the other end. The rocker arm is rotatably attached to the support and has wheels at the front and back ends for supporting the rocker arm on the ground. The vertical position of the wheels relative to the rocker arm is variable.

16 Claims, 5 Drawing Sheets

APPARATUS FOR SUPPORTING A CUTTING BLADE ON A MOWER

FIELD OF THE INVENTION

The present invention relates to improvements in the field of lawn mowers with multiple articulating cutting blades, and particularly to a manner of support for the cutting blades to optimize the position of the blades for cutting relative to the ground.

DESCRIPTION OF THE PRIOR ART

In many applications it is desirable to have a mower which can cut a relatively wide path of grass in order to handle larger lawns and fields. The cost and time of mowing can be substantially reduced by using a mower with a wide cutting path. However, the wider the cutting path is, the more likely it is that a particular path of the mower will encounter irregularities in the terrain. The cutting blades of the mower must be able to articulate over these irregularities, or they will scalp the high areas and miss grass in the low areas.

The articulation of multiple cutting blades poses several issues for a mowing apparatus. The relative movement of the blades should be controlled to provide an even cutting of the grass. At the same time, the manner of articulation requires means for providing movement of the blades while also powering the blades in the cutting action. There are numerous proposals for solutions to problems associated with this articulation, including what kind of articulation to permit, how to implement that articulation, and how to maintain delivery of power to the cutting blades during articulation.

It is also important to optimize the position of the blades for cutting. For example, with a relatively large mowing apparatus the blades may not be maintained at an appropriate height relative the grass. As the mower encounters hills or valleys, the height of the blades must ride over the surface to minimize or avoid having grass which is cut too long or too short. If a single point of support, e.g., a single wheel, is used, the placement of the support may improperly ride over the ground. On the other hand, when multiple support points are used, the grass will still not be appropriately cut if the support wheels do not maintain contact with the ground. There has therefore remained a continuing need for a wheel support system which provides proper positioning of the blades for cutting, even when hills or valleys are encountered.

SUMMARY OF THE INVENTION

Briefly describing one aspect of the present invention, there is provided an apparatus for supporting a cutting blade on a mower which provides enhanced positioning of the cutting blade relative the grass to be mowed. The apparatus includes a support member mounted to the mower and carrying the rotatable cutting blade. The support member is attached at one end to the mower to pivot about a horizontal axis, and at the opposite end is carried by a pair of wheels connected to a rocker arm. The rocker arm rotates about a horizontal axis relative to the support member. The present invention also generally relates to the foregoing configuration as an improvement to mower designs, and to mowers utilizing this support system for the blades.

It is an object of the present invention to provide an apparatus for supporting a cutting blade on a mower which enhances the position of the blade relative to the grass to be cut.

A further object of the present invention is to provide a cutting blade support which rides easily over the ground, and which is readily adjusted to different heights as desired.

It is another object of the present invention to provide an improved mower including a support for the cutting blades having the foregoing features and advantages.

Further advantages of the present invention will be apparent from the description of the preferred embodiment which follows.

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention is related to a mowing apparatus which includes articulating cutting decks supporting cutting blades that smoothly and accurately follow the contour of the terrain being cut. As used herein, the term cutting deck refers generally to the mounting structure to which the cutting blades are rotatably attached. Thus, reference to the articulation of the cutting decks is similarly a reference to the articulation of the supported cutting blades. The preferred embodiment is shown in respect to three cutting decks, one in the center and one on either side. However, it will be appreciated that the principles of the present invention apply equally well to any assembly of cutting decks secured together for articulation.

The present invention is also useful with any apparatus that is used for mowing. In the preferred embodiment, the articulating cutting blades are shown as being incorporated into a self-contained vehicle that would also include an engine, wheels, controls, etc. The invention could alternatively form a part of an assembly that is attached to a separate vehicle which pushes or pulls the mowing apparatus.

Articulation of the cutting decks and blades requires that the decks be mounted to permit relative movement in two respects. First, the decks are mounted directly or indirectly to a supporting framework and are permitted to move relative thereto. Second, a given deck is attached to at least one adjacent deck in a manner to permit one deck to pivot or otherwise move relative to the other deck. In a preferred embodiment and for purposes of description herein, there is provided an assembly of three decks, namely a center deck and two side decks.

To provide the desired positioning of a deck relative the ground, the decks each ride at least partially on wheels which roll over the ground. Preferably each deck is permitted to be supported relative the ground by three support points. For example, a side deck is pivotally hinged to the center deck at two coaxial locations. The side deck is also supported along the ground at its outer edge. The two hinge locations plus the outer support constitute three point support for the side deck. Since the three points define a plane, the deck is properly supported on the ground and is free to closely follow the contour of the ground over which it moves.

Similarly, the center deck and supported cutting blade are positioned for three point support relative the ground. The front of the center deck is supported for pivoting along a horizontal hinge line, and the rear of the deck is supported at a single point by a wheel. The two points required to establish the hinge line and the single point of rear support constitute three point support for the center deck.

The cutting blades are driven by drive belts and pulleys. One belt provides power from the engine to the center deck. When three decks are included, a separate belt provides power from the center deck to each of the side decks. As the center deck articulates relative to the engine, and the side decks articulate relative to the center deck, the distance between belt pulleys changes. Proper tension is maintained in the belts by changing the effective distance over which the belts must travel between the pulleys. In particular, this is accomplished by routing each belt around a pair of idler pulleys that are rotatably attached to a pulley arm. The pulley arm is attached pivotally to the mower, and thereby the path of drive belt in engagement with the idlers is changed as required.

The belt is wrapped in an "S" shape around the idlers. As the drive pulleys move apart during articulation, the "S" shape unwinds as the idler pulleys rotate in one direction about the pivot point of the pulley arm. As the drive pulleys move closer together, the "S" shape winds further as the idler pulleys rotate in the other direction about the pivot point of the pulley arm.

The pulley arm is biased in a direction which increases tension on the associated drive belt. The pivot arm may be biased in this manner in various ways well known in the art. For example, biasing is accomplished by attaching a spring at one end to the pulley arm, and at the other end to one of the cutting decks. The spring pulls on the pulley arm in the direction of increasing belt tension. Various other means for biasing the pulley arm in the required direction may be used.

Figure 1:
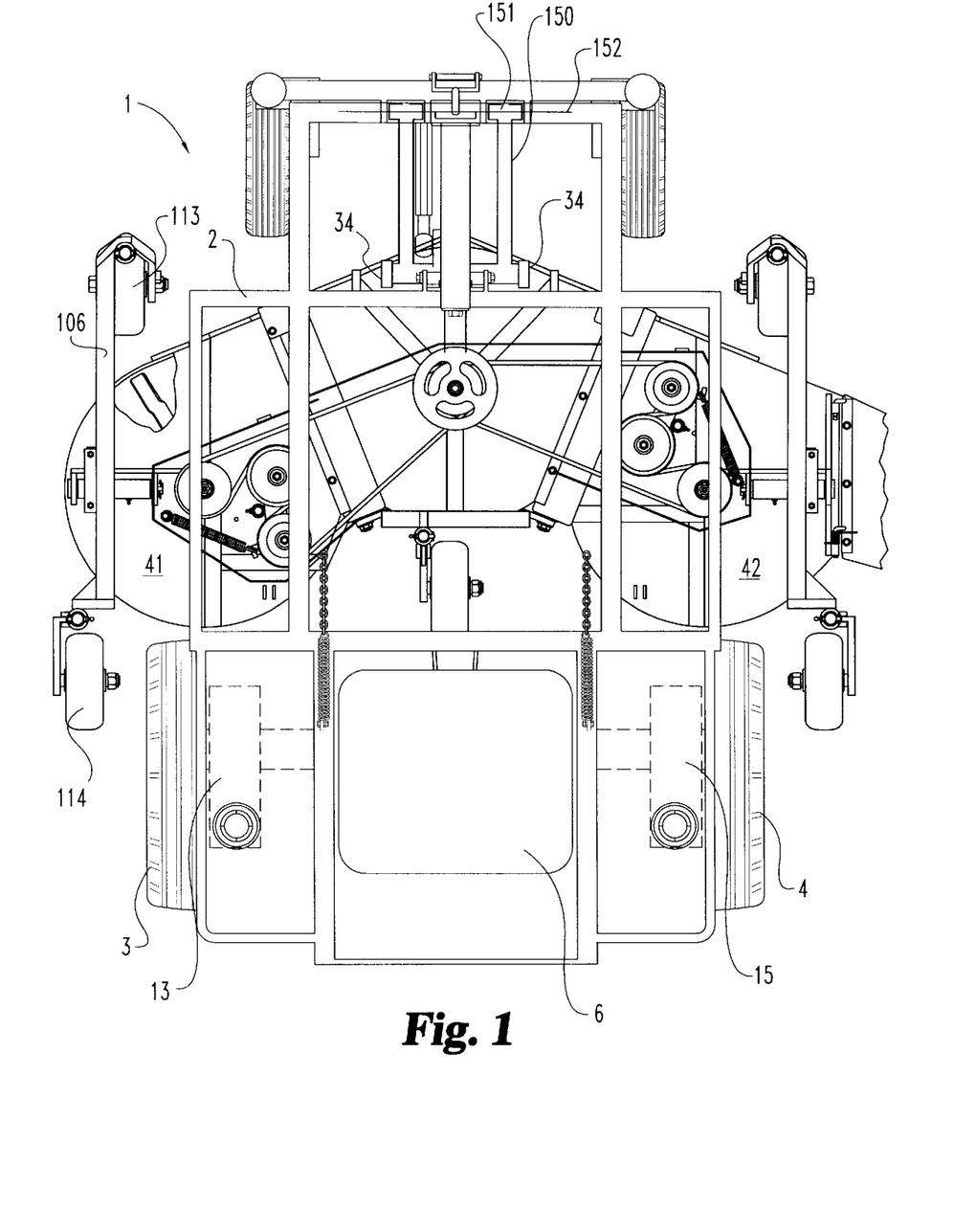
FIG. 1 is a top, plan view of portions of a mowing vehicle incorporating the preferred embodiment of the present invention.
Figure 2:
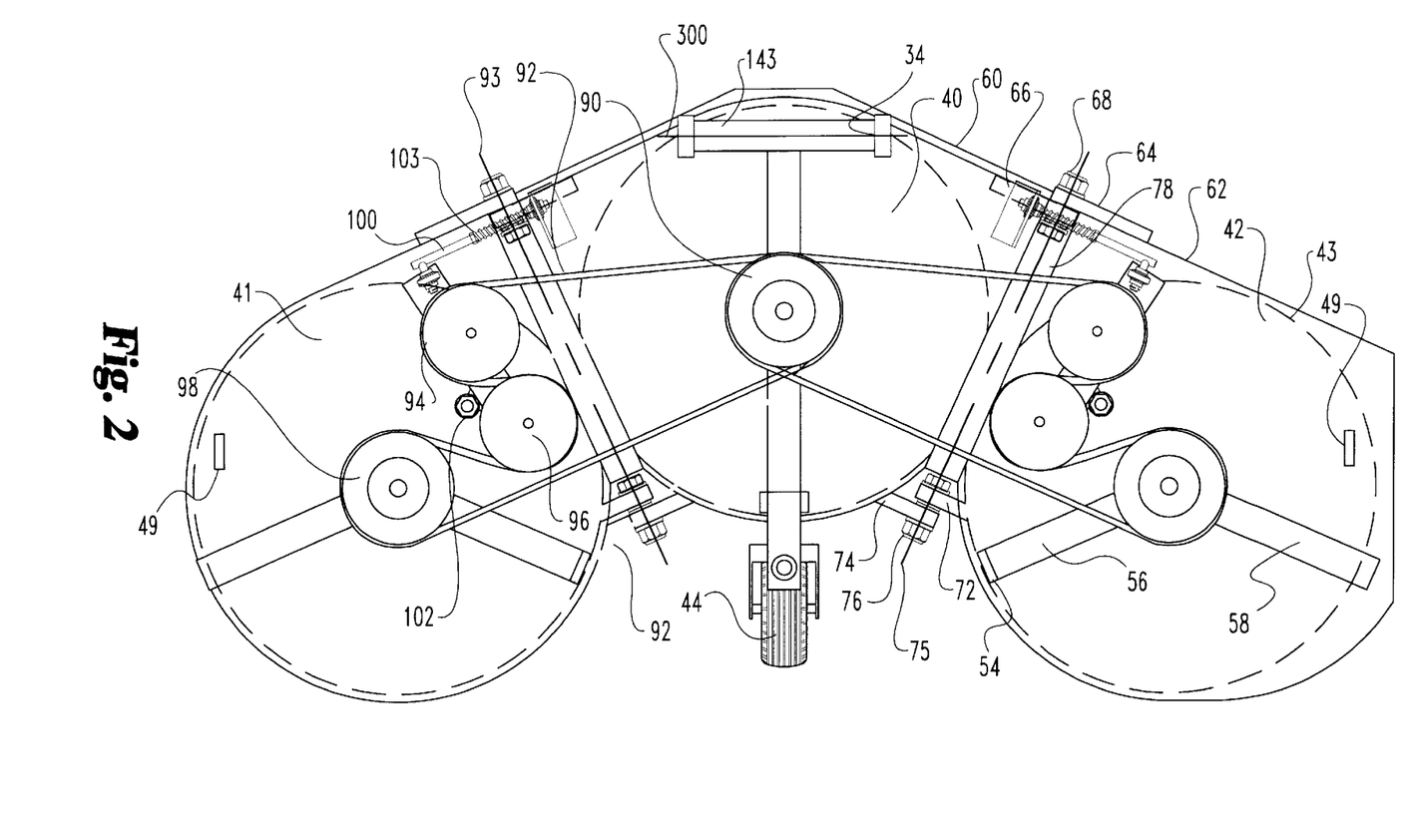
FIG. 2 is a top, plan view of cutting decks useful with the present invention.
Figure 4:
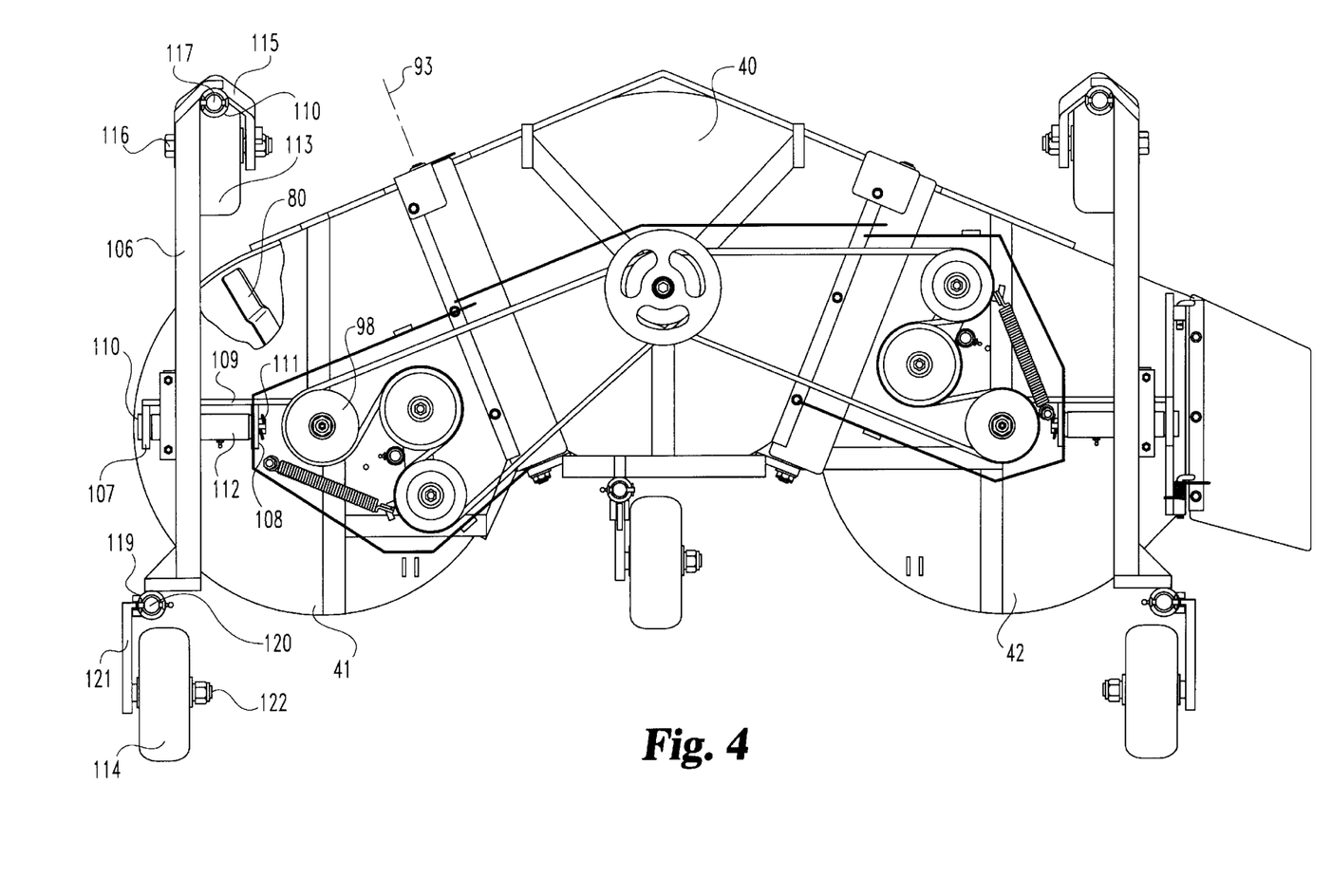
FIG. 4 is a top, plan view of a portion of a mower, showing in particular the support apparatus of the present invention.

Referring in particular to the drawings, there is shown an apparatus 1 for supporting a cutting blade on a mowing vehicle in accordance with the preferred embodiment of the present invention. The cutting decks shown in FIGS. 2 and 4 are slight variants of each other, the primary difference being in the manner by which the drive belts to the outer decks are tensioned. The apparatus for supporting a cutting blade on a mowing vehicle is otherwise identical in its connection and operation with the decks of FIGS. 2 and 4. The following discussion is directed to the decks of both FIGS. 2 and 4 with minor differences pointed out as necessary. There is shown in FIG. 1 a mowing vehicle 1 including a main frame 2 which extends side to side and front to rear of the vehicle and forms a means of support for many of the components of the vehicle. Vehicle 1 includes driving wheels 3 and 4, which receive power from hydraulic drive units 13 and 15, respectively. These hydraulic drive units, as well as the cutting blade drive system to be described later, are powered by engine 6, which is supported by main frame 2. For purposes of clarity and since they form no part of the present invention, the seat, various covers, and control components are not shown in FIG. 1.

Attached on either side of center deck 40 are side decks 41 and 42. Attachment of side deck 42 to center deck 40 and vertical support of side deck 42 will be described in detail. The attachment and support scheme of side deck 41 to center deck 40 is a mirror image of that for side deck 42 and therefore is not separately described.

Side deck 42 incorporates stiffeners 56 and 58 (FIG. 2) to reduce bending of the side deck. Stiffener 56 also incorporates attachment 54. Attachment 54 can be used to attach a spring between the deck and the frame for load transfer to main frame 2. This load transfer helps reduce the vertical load of center deck rear wheel 44, and thus reduce damage to the grass from the footprint of the wheel.

Center deck support 143 mounts the center deck 40 to the frame 2. The support 143 includes a pair of forwardly extending arms 150 which terminate in sleeves 151 received upon shafts mounted to the frame 2, thereby providing for pivoting of the center deck support about the horizontal rotational axis 152. The center deck is further supported by pivotal attachments 34 of center deck support 143 (FIG. 20). These pivotal attachments define rotational axis 300 for center deck 40. Center deck 40 is supported vertically at the rear by wheel 44.

In FIG. 2 there are shown the three cutting decks of the preferred embodiment, and in particular the pivoting attachment of the side decks to the center deck. Front side hinge plate 64 is attached rigidly to side housing 62 of side deck 42. Front center hinge plate 66 is attached to the inside of center housing 60 of center deck 40, as shown by the dashed lines in FIG. 2. Hinge plates 64 and 66 are rotatably connected by pivot 68. Side deck 42 is also rotatably attached to center deck 40 at the rear of both decks. Rear side hinge plate 72 is attached to side housing 62, and rear center hinge plate 74 is attached to center housing 60. Hinge plates 74 and 72 are rotatably coupled by pivot 76. Pivots 68 and 76 create an axis of rotation 75 of the side deck 42 relative center deck 40. Cover plate 78 covers the area between center housing 60 and side housing 62 that would otherwise be exposed during deck articulation.

Articulation of the cutting blades is accomplished without adversely affecting the cut accomplished by the blades. The cutting circle defined by rotation of the cutting blades is shown, for example, at 43. It will be apparent that the blades are positioned so that there is significant overlap of cutting as the mower is moved forward. There is also sufficient overlap of cutting to avoid gaps in the cutting when the mower is turned in either direction.

Figure 3:
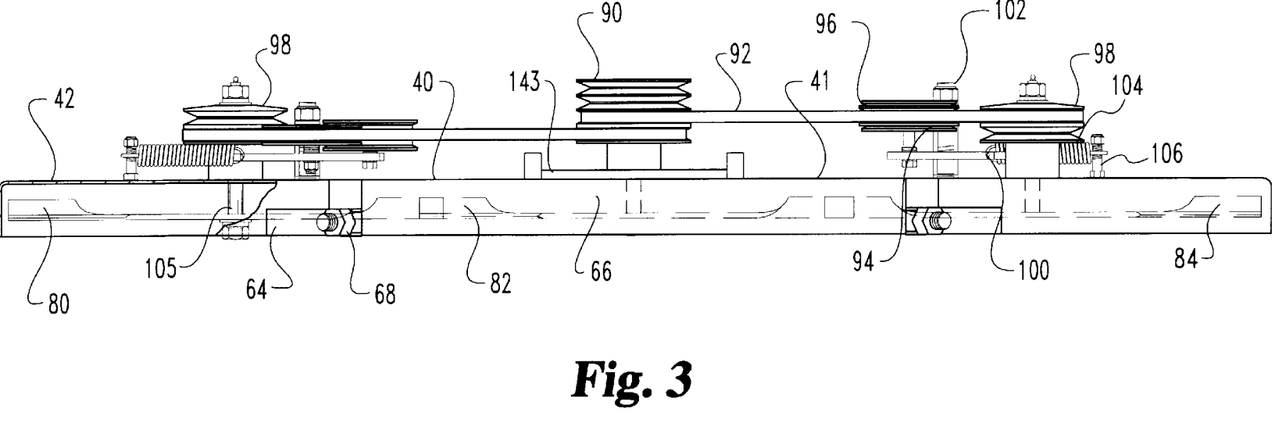
FIG. 3 is a front, elevational view of the cutting decks shown in FIG. 2.

In addition, articulation of the cutting blades optimizes the cutting profile even for uneven terrain. In particular, as shown in FIG. 3, the pivoting axis 75, for movement of the side deck relative the center deck, is located vertically in the plane of cutting by the blades 80 and 82. This provides a distinct advantage when the decks articulate. The pivoting of the connected decks at the blade level only avoids the possibility of the blades moving to or from each other.

In FIGS. 2–4 there is shown the manner in which the side cutting blades of the present invention are driven. Center drive pulley 90 is driven by a drive belt (not shown), which in turn receives power from a pulley mounted to the drive shaft of engine 6. However, it is also possible for power to be transmitted to pulley 90 in another manner. For example, power could be provided to pulley 90 hydraulically, by a gear linkage, or in other ways. The manner of driving the center pulley does not impact on the mode of operation of the side pulley drive.

Center pulley 90 is coupled with and drives side drive pulley 98 by means of side drive belt 92. Side drive belt 92 engages idler pulleys 94 and 96, and also side drive pulley 98. Side drive pulley 98 is attached to a shaft 105 that is attached to a cutting blade 84, the pulley 98, shaft 105 and blade 84 mounted for rotation as a unit with deck 42, as shown in FIG. 3.

As side deck 41 rotates about axis 93, the distance from side drive pulley 98 to center drive pulley 90 changes. Since drive belt 92 is of a constant length, the drive path of belt 92 must change to accommodate the change in distance between drive pulleys. The change in distance between drive pulleys 98 and 90 is accommodated by a complementary change in the path of the drive belt that engages idler pulleys 94 and 96 by pivoting idler pulleys 94 and 96 to maintain necessary belt tension.

The idler pulleys 94 and 96 are rotatably mounted onto pulley arm 100. Pulley arm 100 is attached to side deck 41 by pivot 102 and is thereby rotatable about a vertical axis extending generally normal to the plane of the drive belt. Pivot 102 is preferably located between the rotational axes of pulleys 94 and 96. Tension spring 103 connects to pulley arm 100 at attachment 101, and to deck 41 at attachment 104. Spring 103 applies a force on pulley arm 100 to bias the arm in the direction to increase tension on the belt. In FIG. 4, tension spring 103 is in tension between deck 41 and arm 100 to rotate the pulley arm in the clockwise direction, and in FIG. 2, tension spring 103 is in compression between the arm and the deck to keep belt 92 in tension.

When side deck 41 articulates relative to center deck 40 in the upward direction, the distance from side drive pulley 98 to center drive pulley 90 will decrease since the decks pivot relative one another at a location below the drive belt. In this instance, spring 103 will rotate pulley arm 100 about pivot point 102. Since pivot 102 is located between pulleys 94 and 96, clockwise rotation (FIG. 4) of pulley arm 100 results in a change in the path of drive belt 92 that wraps around the idler pulleys. The result is that the slack which would otherwise occur in the belt is taken up by the idler pulleys.

Conversely, if the the side deck pivots in a downward direction relative the center deck, the distance between side drive pulley 98 and center drive pulley 90 increases. In this instance, pulley arm 100 will rotate against the force of the spring 103 (FIG. 4) in the counter-clockwise direction. This will after the travel path for the drive belt between the pulleys 90 and 98. At the same time, the continuing spring force applied to the pulley arm 100 will maintain the desired tension on the side drive belt.

Side drive belt 92 engages idler pulleys 94 and 96 in an "S" shape. As seen in FIG. 2 (or FIG. 4), side drive belt 92 wraps around one side of idler pulley 94, and then crosses over and wraps around the other side of idler pulley 96. Because of this crossover between the idler pulleys 94 and 96, movement of side drive belt 92 will cause the idler pulleys to rotate in opposite directions. The belt crossover and opposite rotation of the idler pulleys shown as the preferred embodiment is not required, however. For example, it is also possible to move the assembly of pivot, pulley arm, pulleys, and spring outboard of drive pulley 98. Then, by also moving pivot 102 to the opposite side of idler pulley 94, belt tension would also be maintained during pivoting of the side deck.

The idler pulleys and pulley arm assembly are shown mounted to the side deck. However, it is clear that the assembly could alternatively be mounted on the center deck. More generally, the pulley arm assembly could be mounted to either the driving or driven deck, or even to the mower at a location separate from the decks.

Although the preferred embodiment is shown using tension spring 103, it would also be possible to accomplish the biasing of pulley arm 100 with other conventional means. Alternate means include, for example, a compression spring or a torsional spring, in a manner known to those of ordinary skill in the art. FIG. 2 illustrates the use of a compression spring rather than an extension spring to accomplish the biasing of pulley arm 100.

Referring to FIGS. 1–5, the present invention provides a particularly advantageous system for mounting the cutting blades to the mower. Deck 41 constitutes a support attached to the mower. Blade 80 is secured to shaft 105 which is rotatably mounted to deck 41 and coupled to pulley 98 in conventional fashion. As previously described, deck 41 pivots relative to deck 40 about a horizontal axis 93.

Figure 5:
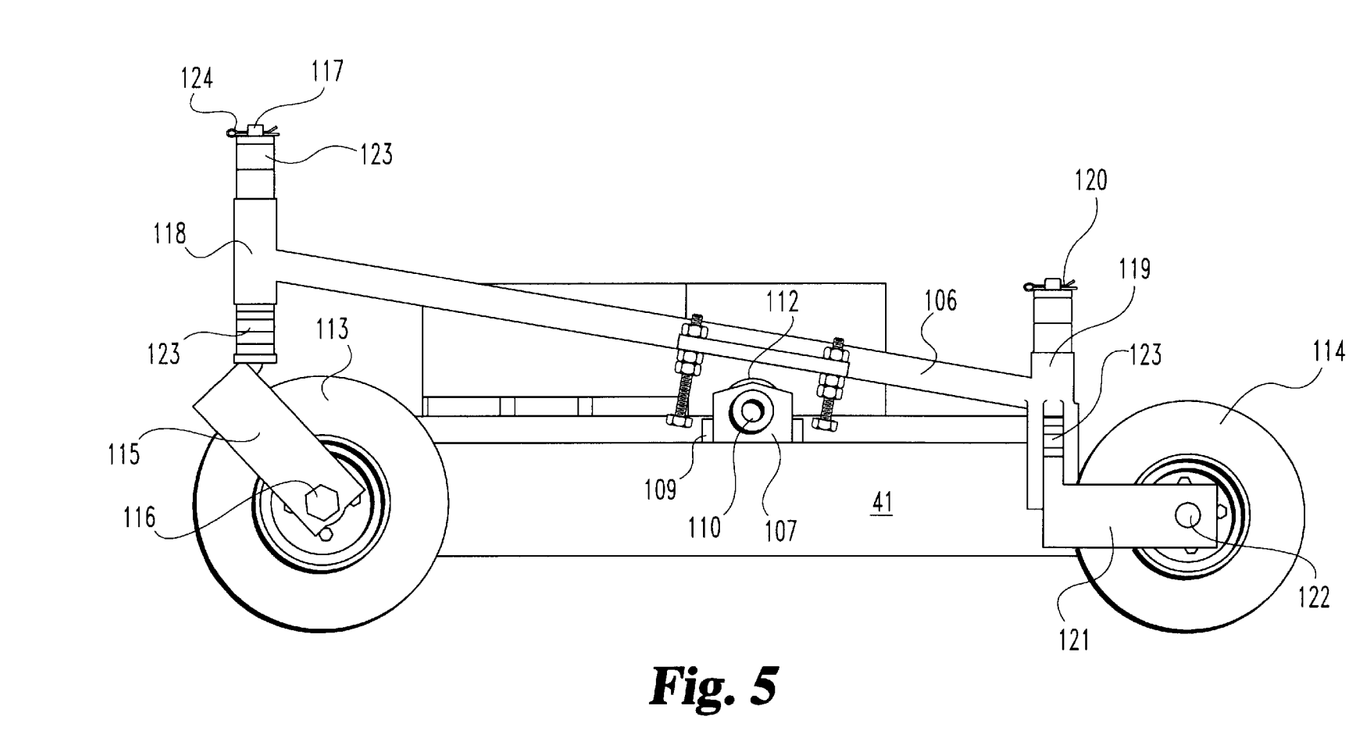
FIG. 5 is a side, elevational view of the present invention.

A rocker arm 106 is rotatably mounted to deck 41 and serves to support the outer portion of the deck upon the ground. Ears 107 and 108 are attached to the deck and stiffener 109 is similarly attached to the deck and extends between the ears. A bolt 110 is received through holes in the ears 107 and 108, and is retained by pin 111. Collar 112 is received over bolt 100 and the rocker arm is secured to the collar. The rocker arm is thereby mounted to the deck to be rotatable about the axis of the bolt 110.

The rocker arm carries a pair of wheels 113 and 114. Yoke 115 includes an axle 116 upon which the wheel 113 is rotatably received. The yoke is attached to a vertical shaft 117 which is rotatably received within a sleeve 118 secured to the rocker arm. The shaft is rotatable about its axis, thereby permitting the wheel 113 to pivot freely at the front of the rocker arm. At the rear of the rocker arm there is secured a second sleeve 119 in which is rotatably received a vertically-extending shaft 120. Secured to the shaft 120 is a flange 121 which carries an axle 122 upon which the wheel 114 is rotatably received.

Means are provided for adjusting the vertical position of the wheels relative to the mower. As shown in particular in FIG. 5, a series of spacers are used to adjust the relative position of the wheels by varying the position of the shafts in comparison to the respective sleeves. For example, the front wheel 113 is shown with several spacers 123 received on the shaft 117 below the sleeve 118, and several other spacers similarly received on the shaft 117 but above the sleeve 118. The spacers are retained upon the shaft by means of a quick-release pin 124. A similar arrangement is used for the mounting of the rear wheel 114. It will be readily appreciated that the vertical position of the shaft, and therefore of the wheel, relative to the mower can be easily adjusted by varying the location of the spacers above and below the sleeve.

It has been discovered that the use of a rocker arm assembly provides a unique advantage for supporting the cutting deck on the mower and upon the ground. The deck will move relative the mower along the pivoting axis 93, corresponding to the hinge mounting of the deck to the adjacent deck 40. It is therefore only necessary to define a third point of support for the positioning of the deck. The rocker arm provides this third point of reference.

At the same time, the rocker arm is superior to alternate designs in that the wheels 113 and 114 are free to ride upon the ground and maintain contact despite hills or valleys that may be encountered. If the rocker are was not free to rotate about the horizontal axis of the support 111, then there would be instances when one or the other of the wheels would lose contact with the ground. For example, if the wheel 113 encountered a bump on the ground, then both wheels 113 and 114 would have to rise up together, and the cutting deck and blade would be raised unnecessarily high relative the ground and the grass would be cut too high. By comparison, with the present rocker arm system the rear wheel 114 would remain in contact with the ground when the front wheel rises up over a bump, thereby providing a more uniform cutting of the grass despite the presence of such bumps.

At the same time, the present design prevents over rotating of the rocker arm 106. As shown in FIG. 5, limits are included to control the rotation of the arm. A plate 125 is secured to the rocker arm and extends in front of and behind the axis of rotation. A bolt 126 is received within a threaded hole of the plate and nuts 127 and 128 are positioned on opposite sides of the plate. The head of the bolt is positioned to abut against the deck 41 when the front of the rocker arm rotates downwardly a sufficient amount. Therefore, simple adjustment of the bolt 126 relative to the plate 125 allows for adjustment of the maximum extent of downward travel of the front of the rocker arm. A similar assembly is provided on the rearward portion of the plate to limit downward travel of the back of the rocker arm.

The limit control for the rocker arm is useful when certain types of terrain are encountered. For example, if there is a hole in the ground, then the front wheel 116 would normally drop down into the hole. This could cause difficulties in continued movement of the mower, or could cause scalping of the grass. However, when a hole is encountered the wheel is prevented from dropping into the hole any farther than the rocker arm permits. Thus, the wheel would begin to drop into the hole but will be stopped at the point that the bolt 126 engages the deck 41.

It will therefore be appreciated that the present invention provides an apparatus for supporting a cutting blade on a mower which has distinct advantages in terms of positioning the blade relative the grass to be cut. When bumps or the like are encountered, the rocker arm is free to rotate and thereby maintain the cutting blade in a more even position relative to the grass. When holes are encountered, the limits on the rocker arm maintain the cutting blade in a sufficiently high position relative to the ground.

The present invention is readily contrasted with conventional mounting systems of the prior art. In one approach, a pair of wheels would have been rigidly attached to the cutting deck, thus presenting the problem previously described with respect to having a wheel raise above the ground at times. If a single wheel is used, then problems can occur when either high or low spots are encountered.

In addition, the present invention is useful in terms of the utility of the overall mower. As shown in FIG. 4, the rocker arm and respective wheels can be positioned to avoid intereference with either side of the mower. On the left side in FIG. 4, the rocker arm and wheels are positioned so that the cutting blade can fully extend to the side of the mower, thereby allowing the mower to be used on that side for close edge trimming. On the other hand, the positioning of the rocker arm and wheels on the right side in FIG. 4 avoid interfering with the discharge chute for the mower.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for supporting a cutting blade on a mower, the apparatus comprising:
    a support member having first and second generally opposing sides and being pivotally attached to the mower at said first side along a generally horizontal axis;
    a rotatable shaft secured to the cutting blade and mounted for rotation to said support member between said first and second sides;
    a rocker arm rotatably mounted to said support member at said second side, said rocker arm having first and second ends; and
    a support wheel mounted at each end of said rocker arm for supporting said rocker arm on a surface.

2. The apparatus of claim 1 and which includes adjustment means for adjusting the height of said rocker arm relative a support surface.

3. The apparatus of claim 2 in which said adjustment means includes means for adjusting the position of at least one of said support wheels relative to said rocker arm.

4. The apparatus of claim 1 in which at least one of said support wheels is a caster wheel.

5. The apparatus of claim 1 and which includes limit means for limiting the amount of rotation of said rocker arm relative to said support member.

6. In an apparatus for supporting a cutting blade on a mower, the apparatus including a support member having opposing first and second sides and being attached to the mower about a generally horizontal axis and including a rotatable shaft secured to the cutting blade and mounted for rotation to the support member between the first and second sides, the improvement comprising:
    a rocker arm rotatably mounted to the support member at the second side of the support member, said rocker arm having first and second ends; and
    a support wheel mounted at each end of said rocker arm for supporting said rocker arm on a surface.

7. The improvement of claim 6 and which includes adjustment means for adjusting the height of said rocker arm relative a support surface.

8. The improvement of claim 7 in which said adjustment means includes means for adjusting the position of at least one of said support wheels relative to said rocker arm.

9. The improvement of claim 6 in which at least one of said support wheels is a caster wheel.

10. The improvement of claim 6 and which includes limit means for limiting the amount of rotation of said rocker arm relative to the support member.

11. A mower, comprising:
    a frame;
    power means connected with the frame for driving cutting blades;
    ground engaging wheels rotatably mounted to said frame;
    at least one support member having first and second generally opposing sides and being pivotally attached at said first side along a generally horizontal axis to one of said mower frame and another of said at least one support members;

a rotatable shaft mounted for rotation to said at least one support member between said first and second sides;

a cutting blade connected to said shaft;

a rocker arm rotatably mounted about a pivot to said support member at said second side and having first and second ends; and, a support wheel mounted at each end of said rocker arm for supporting said rocker arm on a surface.

12. The mower of claim 11 wherein there are at least two support members, each supporting a cutting blade for rotation and each having a rocker arm rotatably mounted to said second side of said support member.

13. The mower of claim 11 further including a central support member having left and right sides, being mounted to and subjacent said frame, having a rotatable shaft mounted for rotation between the left and right sides, and having a cutting blade connected to said shaft.

14. The mower of claim 13 wherein said at least one support member is pivotally attached at its first side to one of the left and right sides of said central support member.

15. The mower of claim 14 wherein said drive means includes a motor mounted to said frame, a pulley and belt combination extending between said motor and the rotatable shaft of said central support member, and a pulley and belt combination extending between the rotatable shaft of said central support member and the rotatable shaft of said at least one support member.

16. The mower of claim 11 wherein each of said support wheels each have an axle and wherein said rocker arm includes height adjustment means for adjusting the vertical distance between the pivot of said rocker arm and the axle of at least one of said support wheels.

* * * * *

UNITED STATES PATENT AND TRADEMARK OFFICE
CERTIFICATE OF CORRECTION

PATENT NO : 6,000,202
DATED : December 14, 1999
INVENTOR(S) : Jeffrey J. Laskowski It is certified that error appears in the above-identified patent and that said Letters Patent are hereby corrected as shown below:

In column 4, line 24, please change "20" to --2--.

In column 5, line 50, please change "after" to --alter--.

Signed and Sealed this

Fifteenth Day of May, 2001

Attest:

NICHOLAS P. GODICI

*Attesting Officer*         *Acting Director of the United States Patent and Trademark Office*